(12) United States Patent
Huang et al.

(10) Patent No.: US 10,946,495 B2
(45) Date of Patent: Mar. 16, 2021

(54) LOW DENSITY POLISHING PAD

(71) Applicant: NexPlanar Corporation, Hillsboro, OR (US)

(72) Inventors: Ping Huang, Beaverton, OR (US); William C. Allison, Beaverton, OR (US); Richard Frentzel, Murrieta, CA (US); Paul Andre Lefevre, Portland, OR (US); Robert Kerprich, Portland, OR (US); Diane Scott, Portland, OR (US)

(73) Assignee: CMC Materials, Inc., Aurora, IL (US)

( * ) Notice: Subject to any disclaimer, the term of this patent is extended or adjusted under 35 U.S.C. 154(b) by 777 days.

(21) Appl. No.: 14/611,064

(22) Filed: Jan. 30, 2015

(65) Prior Publication Data

US 2016/0221145 A1     Aug. 4, 2016

(51) Int. Cl.
*B24B 37/24* (2012.01)
*B24B 37/20* (2012.01)
*B24B 37/26* (2012.01)
*C08J 9/00* (2006.01)
*C08J 9/228* (2006.01)

(52) U.S. Cl.
CPC ............ *B24B 37/24* (2013.01); *B24B 37/205* (2013.01); *B24B 37/26* (2013.01); *C08J 9/0061* (2013.01); *C08J 9/228* (2013.01); *C08J 2333/00* (2013.01); *C08J 2375/04* (2013.01); *C08J 2433/00* (2013.01); *C08J 2475/04* (2013.01)

(58) Field of Classification Search
CPC .......... B24B 37/20; B24B 37/24; B24B 37/26
USPC .................... 451/526, 527, 533, 534; 51/296
See application file for complete search history.

(56) References Cited

U.S. PATENT DOCUMENTS

| | | | |
|---|---|---|---|
| 6,126,532 A * | 10/2000 | Sevilla | B24B 41/047 451/526 |
| 6,231,942 B1 | 5/2001 | Blizard et al. | |
| 6,239,188 B1 | 5/2001 | Kihara et al. | |
| 6,375,543 B1 * | 4/2002 | Kuramochi | B24D 3/18 451/28 |
| 6,913,517 B2 | 7/2005 | Prasad | |

(Continued)

FOREIGN PATENT DOCUMENTS

| | | |
|---|---|---|
| EP | 2806453 A1 | 11/2014 |
| JP | 11-322877 | 11/1999 |

(Continued)

OTHER PUBLICATIONS

European Patent Office as ISA, International Search Report issued in connection with Patent Application No. PCT/US2016/013302 dated Apr. 29, 2016.

(Continued)

*Primary Examiner* — George B Nguyen
(74) *Attorney, Agent, or Firm* — Thomas Omholt; Erika R. Singleton

(57) ABSTRACT

Low density polishing pads and methods of fabricating low density polishing pads are described. In an example, a polishing pad for polishing a substrate includes a polishing body having a density approximately in the range of 0.4-0.55 g/cc. The polishing body includes a thermoset polyurethane material and a plurality of closed cell pores dispersed in the thermoset polyurethane material. Each of the plurality of closed cell pores has a shell composed of an acrylic co-polymer.

11 Claims, 12 Drawing Sheets

(56) References Cited

U.S. PATENT DOCUMENTS

| | | |
|---|---|---|
| 7,435,364 B2 | 10/2008 | James et al. |
| 7,976,901 B2 | 7/2011 | Kume et al. |
| 8,075,372 B2 | 12/2011 | Prasad |
| 2003/0220061 A1 | 11/2003 | Prasad |
| 2004/0072522 A1 | 4/2004 | Petroski et al. |
| 2005/0215177 A1 | 9/2005 | Prasad |
| 2006/0089095 A1* | 4/2006 | Swisher ................ B24B 37/205 451/533 |
| 2006/0276109 A1 | 12/2006 | Roy et al. |
| 2010/0035529 A1 | 2/2010 | Kulp et al. |
| 2011/0171883 A1* | 7/2011 | Allison ................ B24B 37/205 451/6 |
| 2012/0094586 A1* | 4/2012 | Huang .................... B24B 37/24 451/527 |
| 2012/0279138 A1 | 11/2012 | Fukuda et al. |
| 2013/0324020 A1 | 12/2013 | Lefevre et al. |
| 2014/0033615 A1 | 2/2014 | Itoyama et al. |
| 2014/0106652 A1 | 4/2014 | Itoyana et al. |
| 2014/0242894 A1* | 8/2014 | Itoyama .................. B24B 37/24 451/548 |
| 2016/0221145 A1* | 8/2016 | Huang ..................... C08J 9/228 |

FOREIGN PATENT DOCUMENTS

| | | |
|---|---|---|
| JP | 2000-344902 | 12/2000 |
| JP | 2008-168416 | 7/2008 |
| JP | 2009-514027 | 4/2009 |
| JP | 2013025844 A | 2/2013 |
| KR | 10-2010-0106841 | 10/2010 |
| TW | I280266 | 5/2007 |
| TW | 201018545 | 5/2010 |
| TW | 201404532 A | 2/2014 |
| WO | 2012051197 A1 | 4/2012 |

OTHER PUBLICATIONS

Taiwan Intellectual Property Office, Search Report issued in connection with Taiwan Patent Application No. 105102956 dated Aug. 10, 2016.
International Search Report and Written Opinion from PCT/US2011/055796 dated Feb. 20, 2012, 8 pgs.
International Preliminary Report on Patentability from PCT/US US2011/055796 dated Apr. 25, 2013, 5 pgs.
Office Action from Taiwan Patent Application No. 100137387 dated Dec. 26, 2013, 4 pgs.
Non-Final Office Action from U.S. Appl. No. 12/979,123 dated Jun. 14, 2013, 10 pgs.
Huang, et al., U.S. Appl. No. 14/183,894, filed Feb. 19, 2014, entitled Polishing Pad With Multi-Modal Distribution of Pore Diameters, 46 pgs.
Huang, et al., U.S. Appl. No. 13/955,398, filed Jul. 31, 2013, entitled "Low Density Polishing Pad,", 52 pgs.
Notification of Grounds for Refusal from Korean Patent Application No. 10-2013-7010017 dated Jan. 16, 2014, 7 pgs.
Japanese Intellectual Property Office, Notice of Reasons for Rejection issued in connection with Japanese Patent Application No. 2017-540179 dated Oct. 1, 2019.

\* cited by examiner

100A

100B

300

100x

300x

LOW DENSITY POLISHING PAD

TECHNICAL FIELD

Embodiments of the present invention are in the field of chemical mechanical polishing (CMP) and, in particular, low density polishing pads and methods of fabricating low density polishing pads.

BACKGROUND

Chemical-mechanical planarization or chemical-mechanical polishing, commonly abbreviated CMP, is a technique used in semiconductor fabrication for planarizing a semiconductor wafer or other substrate.

The process involves use of an abrasive and corrosive chemical slurry (commonly a colloid) in conjunction with a polishing pad and retaining ring, typically of a greater diameter than the wafer. The polishing pad and wafer are pressed together by a dynamic polishing head and held in place by a plastic retaining ring. The dynamic polishing head is rotated during polishing. This approach aids in removal of material and tends to even out any irregular topography, making the wafer flat or planar. This may be necessary in order to set up the wafer for the formation of additional circuit elements. For example, this might be necessary in order to bring the entire surface within the depth of field of a photolithography system, or to selectively remove material based on its position. Typical depth-of-field requirements are down to Angstrom levels for the latest sub-50 nanometer technology nodes.

The process of material removal is not simply that of abrasive scraping, like sandpaper on wood. The chemicals in the slurry also react with and/or weaken the material to be removed. The abrasive accelerates this weakening process and the polishing pad helps to wipe the reacted materials from the surface. In addition to advances in slurry technology, the polishing pad plays a significant role in increasingly complex CMP operations.

However, additional improvements are needed in the evolution of CMP pad technology.

SUMMARY

Embodiments of the present invention include low density polishing pads and methods of fabricating low density polishing pads.

In an embodiment, a polishing pad for polishing a substrate includes a polishing body having a density approximately in the range of 0.4-0.55 g/cc. The polishing body includes a thermoset polyurethane material and a plurality of closed cell pores dispersed in the thermoset polyurethane material. Each of the plurality of closed cell pores has a shell composed of an acrylic co-polymer.

In another embodiment, a method of fabricating a polishing pad involves providing a support layer in a formation mold. The method also involves providing a mixture of a pre-polymer and a chain extender or cross-linker with a plurality of microelements in the formation mold and on the support layer, each of the plurality of microelements having an initial size. The mixture is heated in the formation mold to provide a partially cured molded polishing body comprising a thermoset polyurethane material and a plurality of closed cell pores dispersed in the thermoset polyurethane material, the plurality of closed cell pores formed by expanding each of the plurality of microelements to a larger size during the heating, wherein the partially cured molded polishing body is bonded to the support layer. The method also involves removing the partially cured molded polishing body and support layer pairing from the formation mold. The method also involves, subsequent to removing the partially cured molded polishing body and support layer pairing from the formation mold, further curing the partially cured molded polishing body outside of the formation mold to provide a molded polishing body bonded to the support layer. The method also involves, subsequent to removing the partially cured molded polishing body and support layer pairing from the formation mold, removing the support layer.

DETAILED DESCRIPTION

Low density polishing pads and methods of fabricating low density polishing pads are described herein. In the following description, numerous specific details are set forth, such as specific polishing pad designs and compositions, in order to provide a thorough understanding of embodiments of the present invention. It will be apparent to one skilled in the art that embodiments of the present invention may be practiced without these specific details. In other instances, well-known processing techniques, such as details concerning the combination of a slurry with a polishing pad to perform chemical mechanical planarization (CMP) of a semiconductor substrate, are not described in detail in order to not unnecessarily obscure embodiments of the present invention. Furthermore, it is to be understood that the various embodiments shown in the figures are illustrative representations and are not necessarily drawn to scale.

One or more embodiments described herein are directed to the fabrication of polishing pads having a low density of less than approximately 0.6 grams/cubic centimeter (g/cc) and, more particularly, a low density of less than approximately 0.5 g/cc. The resulting pads may be based on a polyurethane material having a closed cell porosity which provides for the low density. The low density pads may be used, e.g., as buff polishing pads or as polishing pads designed for special chemical mechanical polishing (CMP) applications such as liner/barrier removal. Polishing pads described herein may, in some embodiments, be fabricated to have a density as low as in the range of 0.3 g/cc to 0.5 g/cc, such as approximately 0.357 g/cc. In a particular embodiment, a low density pad has a density as low as approximately 0.2 g/cc.

Figure 1A:
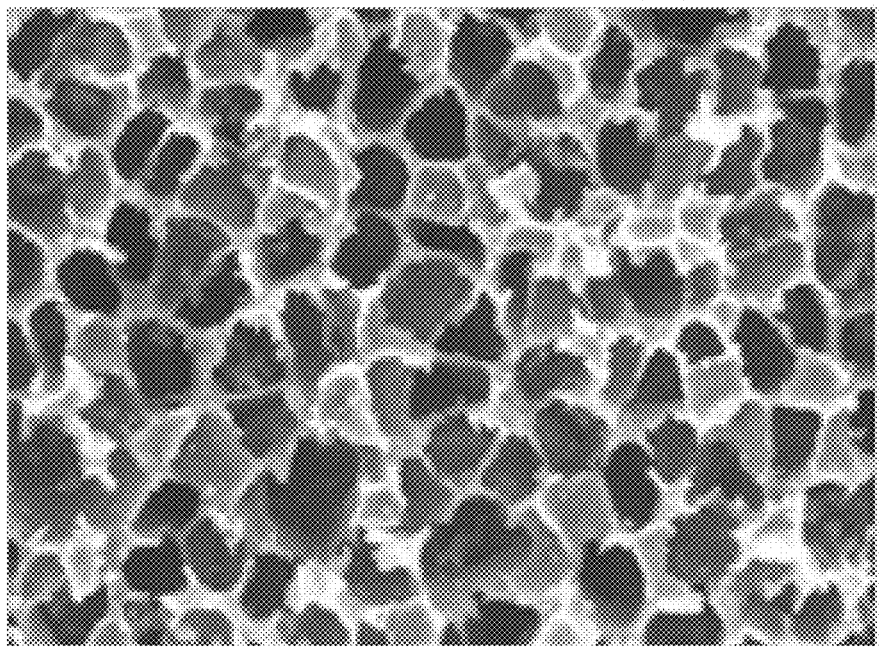
FIG. 1A is a top down view of a POLITEX polishing pad, in accordance with the prior art.
Figure 1B:
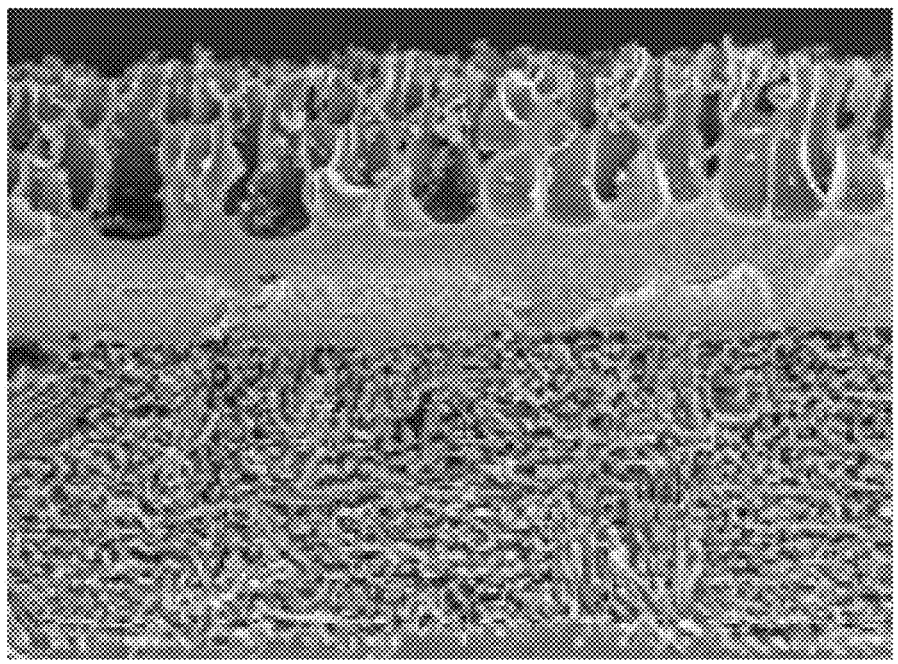
FIG. 1B is a cross-sectional view of a POLITEX polishing pad, in accordance with the prior art.

To provide context, a typical CMP pad has a density around 0.7 to 0.8 g/cc, and is generally at least higher than 0.5 g/cc. Conventionally, a typical CMP buff pad is has a "poromeric" design using large cells open to the surface. A composite polyurethane skin is included on a support, such as in the case of a POLITEX polishing pad. Conventionally, buff pad are very soft and low density made with open cell porosity (e.g., a fiber pad and "poromeric" pad). Such pads typically are associated with two fundamental issues for CMP: short life time and less consistent performance as compared with conventional closed cell polyurethane (but higher density) CMP pads. FIGS. 1A and 1B are a top down view and cross-sectional view, respectively, of a POLITEX polishing pad, in accordance with the prior art. Referring to FIG. 1A, a portion 100A of a POLITEX polishing pad is shown as magnified 300 times in a scanning electron microscope (SEM) image. Referring to FIG. 1B, a portion 100B of a POLITEX polishing pad is shown as magnified 100 times in a scanning electron microscope (SEM) image. Referring to both FIGS. 1A and 1B, the open pore structure of the prior art pad is readily visible.

More generally, one of the fundamental challenges is to fabricate a closed cell polyurethane pad having high porosity and low density. Our own investigations in the fabrication of low density polyurethane pads by a molding or casting process has shown difficulty in merely adding increased volumes of a porogen into a pad formulation mixture to ultimately provide closed cell pores in the pad material based on the added porogen. In particular, adding more porogen than for a typical pad formulation can increase the viscosity of the formulation to levels unmanageable for a casting or molding process. The case can be particularly difficult for the inclusion of pre-expanded porogens or porogens that retain essentially the same volume throughout the molding or casting process. In accordance with an embodiment of the present invention, un-expanded porogens or porogens that increase volume throughout the molding or casting process are included in a pad formulation for ultimate for generation. In one such embodiment, however, if all final closed cell pores are generated from unexpanded porogens, the viscosity of the formulation may be too low for manageability in casting or molding. As such, in one embodiment, in addition forming a formulation to include un-expanded porogens or porogens that increase volume throughout the molding or casting process, pre-expanded porogens or porogens that retain essentially the same volume throughout the molding or casting process are also included to enable viscosity tuning of the pad formulation.

Accordingly, in an embodiment, Unexpanded Porogen Filler or Underexpanded Porogen Filler (both referred to as UPF) that expands at above ambient temperature is used to create porosity in a polishing pad during manufacture by casting or molding. In one such embodiment, a large quantity of UPF is included in a polyurethane-forming mixture. The UPF expands during the pad casting process and creates a low density pad with closed cell pores. The above approach to creating a polishing pad can have advantages over other techniques that have been used to form low density pads with open cells. For example, fabrication of final pad porosity based solely on gas injection or entrainment may require specialized equipment, and may be accompanied by difficulty in controlling final pad density and difficulty in controlling final pore size and distribution. In another example, fabrication of final pad porosity based solely on in situ gas generation, e.g., water reaction with an isocyanate moiety (NCO) to create $CO_2$ bubbles can be accompanied by a difficulty in controlling pore size distribution.

In an aspect of the present invention, low density polishing pads may be fabricated in a molding process. For example, FIGS. 2A-2G illustrate cross-sectional views of operations used in the fabrication of a polishing pad, in accordance with an embodiment of the present invention.

Figure 2A:
FIGS. 2A-2G illustrate cross-sectional views of operations used in the fabrication of a polishing pad, in accordance with an embodiment of the present invention.
Figure 2B:
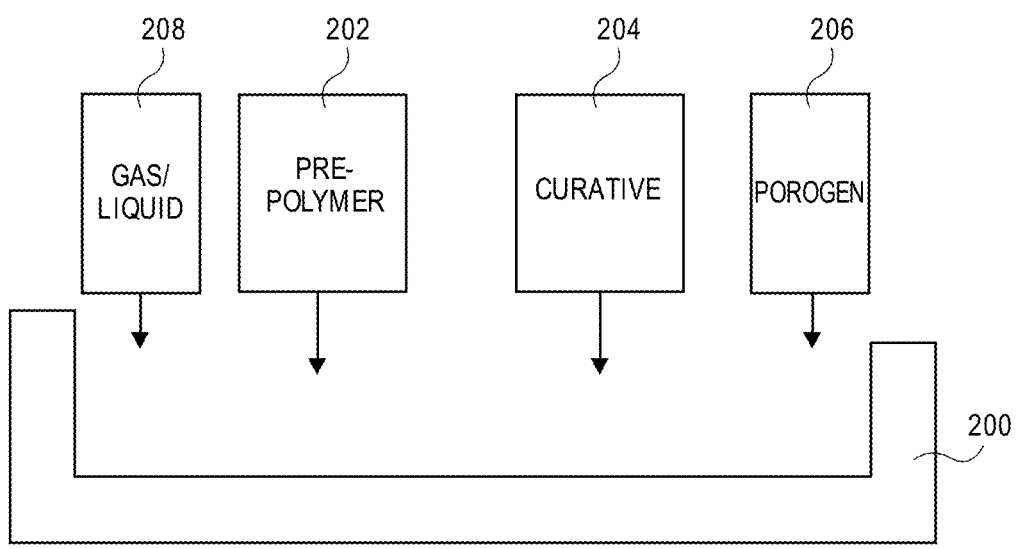

Referring to FIG. 2A, a formation mold 200 is provided. Referring to FIG. 2B, a pre-polymer 202 and a curative 204 (e.g., a chain extender or cross-linker) are mixed with a plurality of microelements to form a mixture. In an embodiment, the plurality of microelements is a plurality of porogens 206, such as filled or hollow microspheres. In another embodiment, the plurality of microelements is a plurality of gas bubbles or liquid droplets, or both, 208. In another embodiment, the plurality of microelements is a combination of a plurality of porogens 206 and a plurality of gas bubbles or liquid droplets, or both, 208.

Figure 2C:
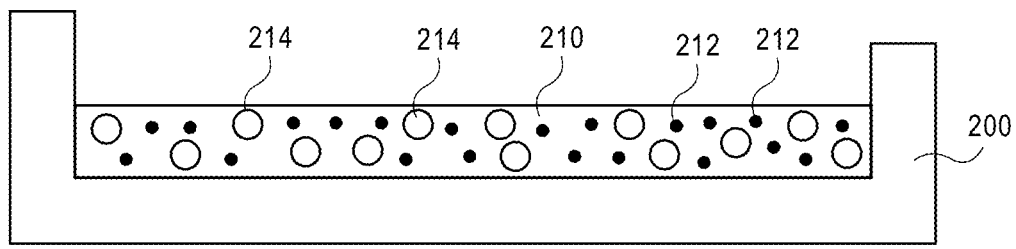

Referring to FIG. 2C, the resulting mixture 210 from FIG. 2B is shown at the base of the formation mold 200. The mixture 210 includes a first plurality of microelements 212, each of the first plurality of microelements having an initial size. A second plurality of microelements 214 may also be included in the mixture 210, as described in greater detail below.

Figure 2D:
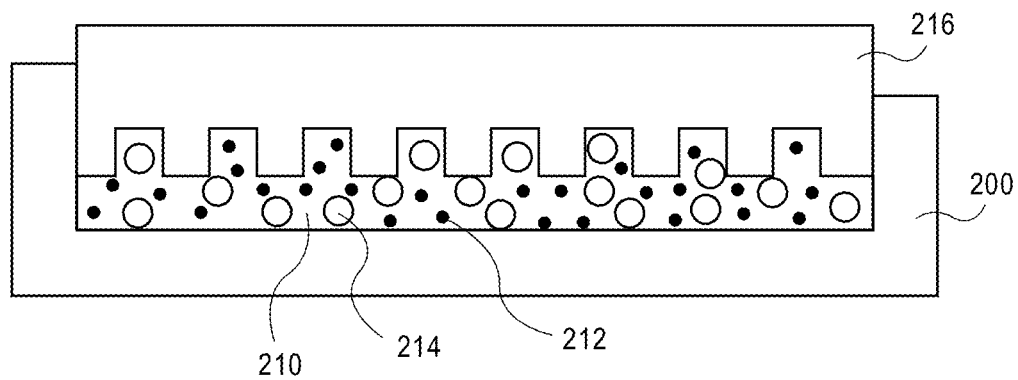

Referring to FIG. 2D, a lid 216 of the formation mold 200 is brought together with the base of the formation mold 200 and the mixture 210 takes the shape of the formation mold 200. In an embodiment, the mold 200 is degassed upon or during bringing together of the lid 216 and base of the formation mold 200 such that no cavities or voids form within the formation mold 210. It is to be understood that embodiments described herein that describe lowering the lid of a formation mold need only achieve a bringing together of the lid and a base of the formation mold. That is, in some embodiments, a base of a formation mold is raised toward a lid of a formation mold, while in other embodiments a lid of a formation mold is lowered toward a base of the formation mold at the same time as the base is raised toward the lid.

Figure 2E:
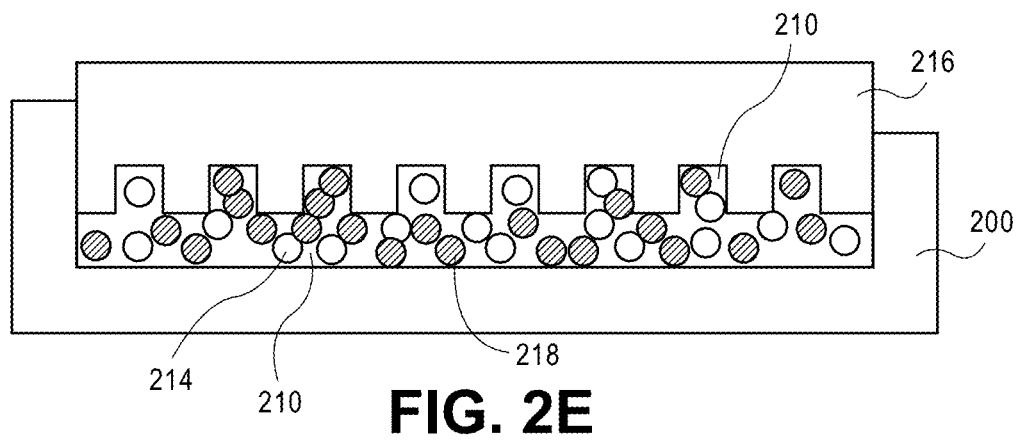

Referring to FIG. 2E, the mixture 210 is heated in the formation mold 200. Each of the plurality of microelements 212 is expanded to a final, larger, size 218 during the heating. Additionally, referring to FIG. 2F, the heating is used to cure the mixture 210 to provide a partially or fully cured pad material 220 surrounding the microelements 218 and, if present, the microelements 214. In one such embodiment, the curing forms a cross-linked matrix based on the materials of the pre-polymer and the curative.

Figure 2F:
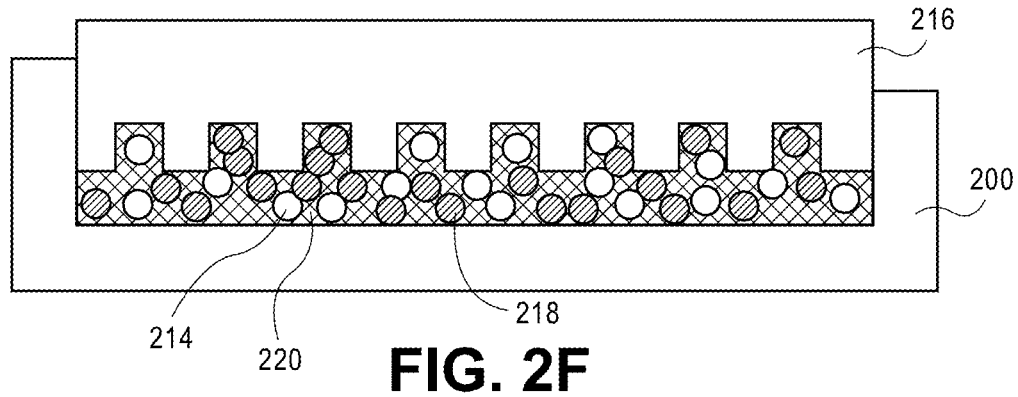

Referring collectively to FIGS. 2E and 2F, it is to be understood that the ordering of expanding microelements 212 to the final, larger, size 218 and the curing the mixture 210 need not necessarily occur in the order illustrated. In another embodiment, during the heating, the curing of the mixture 210 occurs prior to expanding the microelements 212 to the final, larger, size 218. In another embodiment, during the heating, the curing of the mixture 210 occurs at the same time as expanding the microelements 212 to the final, larger, size 218. In yet another embodiment, two separate heating operations are performed to cure the mixture 210 and to expand the microelements 212 to the final, larger, size 218, respectively.

Figure 2G:
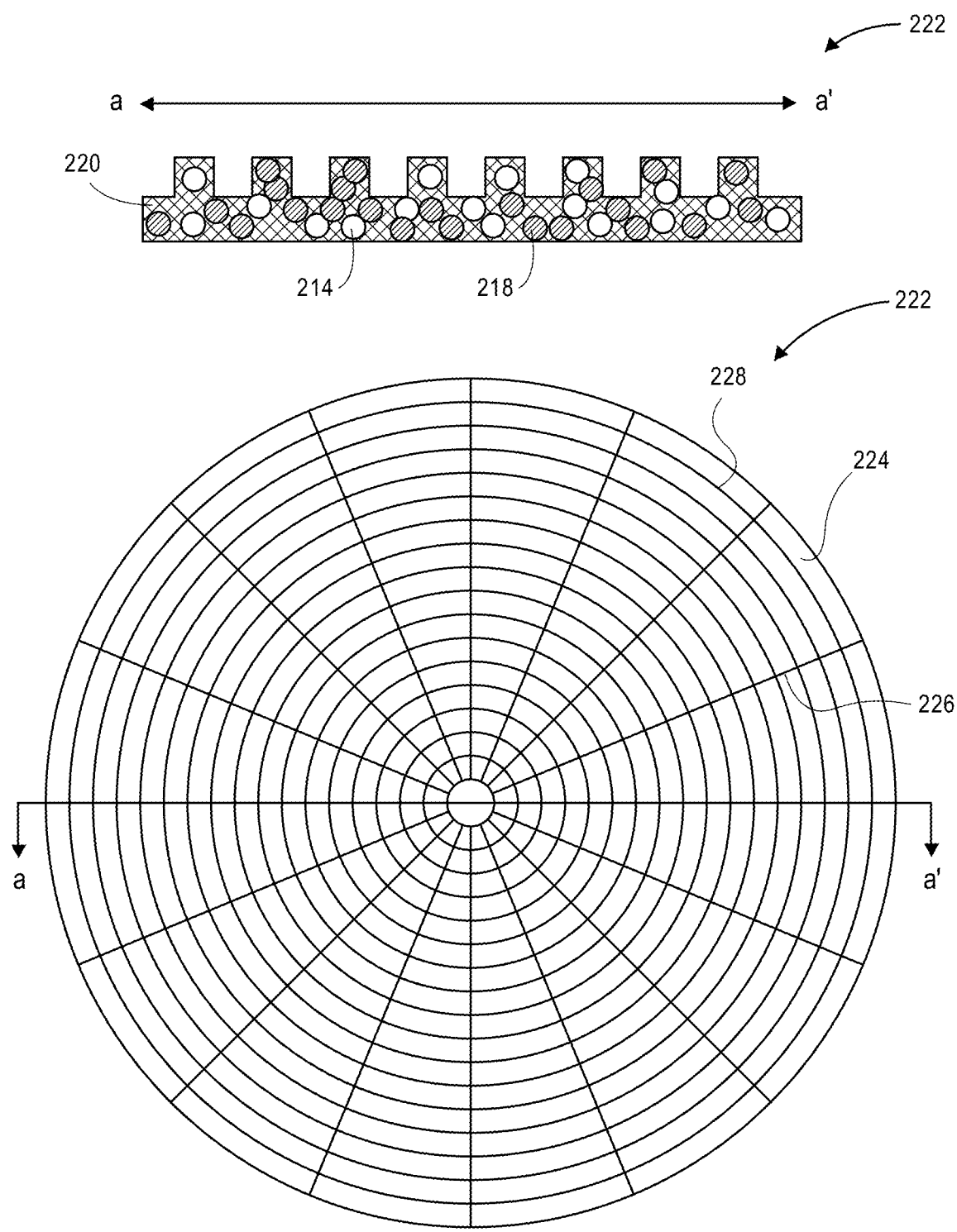

Referring to FIG. 2G, in an embodiment, the above described process is used to provide a low density polishing pad 220. The low density polishing pad 222 is composed of the cured material 220 and includes the expanded microelements 218 and, in some embodiment, additional microelements 214. In an embodiment, the low density polishing pad 222 is composed of a thermoset polyurethane material and the expanded microelements 218 provide a plurality of closed cell pores dispersed in the thermoset polyurethane material. Referring again to FIG. 2G, the bottom portion of the Figure is the plan view of the upper cross-sectional view which is taken along the a-a' axis. As seen in the plan view, in an embodiment, the low density polishing pad 222 has a polishing surface 228 having a groove pattern therein. In one particular embodiment, as shown, the groove pattern includes radial grooves 226 and concentric circular grooves 228.

Referring again to FIGS. 2D and 2E, in an embodiment, each of the plurality of microelements 212 is expanded to the final size 218 by increasing a volume of each of the plurality of microelements by a factor approximately in the range of 3-1000. In an embodiment, each of the plurality of microelements 212 is expanded to the final size 214 to provide a final diameter of each of the plurality of microelements 218 approximately in the range of 10-200 microns. In an embodiment, each of the plurality of microelements 212 is expanded to the final size 218 by reducing a density of each of the plurality of microelements 212 by a factor approximately in the range of 3-1000. In an embodiment, each of the plurality of microelements 212 is expanded to the final size 218 by forming an essentially spherical shape for each of the plurality of microelements 218 of the final size.

In an embodiment, the plurality of microelements 212 is an added porogen, gas bubble or liquid bubble that is then expanded within the pad material formulation to form closed cell pores within a finished polishing pad material. In one such embodiment, the plurality of closed cell pores is a plurality of larger porogens formed by expanding corresponding smaller porogens. For example, the term "porogen" may be used to indicate micro- or nano-scale spherical or somewhat spherical particles with "hollow" centers. The hollow centers are not filled with solid material, but may rather include a gaseous or liquid core. In one embodiment, the plurality of closed cell pores begins as un-expanded gas-filled or liquid-filled EXPANCEL™ distributed throughout a mixture. Upon and/or during forming a polishing pad from the mixture, e.g., by a molding process, the un-expanded gas-filled or liquid-filled EXPANCEL™ becomes expanded. In a specific embodiment, the EXPANCEL™ is filled with pentane. In an embodiment, each of the plurality of closed cell pores has a diameter approximately in the range of 10-100 microns in its expanded state, e.g., in the final product. Thus, in an embodiment, each of the plurality of microelements having the initial size includes a physical shell, and each of the plurality of microelements having the final size includes an expanded physical shell. In another embodiment, each of the plurality of microelements 212 having the initial size is a liquid droplet, and each of the plurality of microelements 218 having the final size is a gas bubble. In yet another embodiment, for form the plurality of microelements 218 having the final size, mixing to form the mixture 210 further involves injecting a gas into the pre-polymer and the chain extender or cross-linker, or into a product formed there from. In a specific such embodiment, the pre-polymer is an isocyanate and the mixing further involves adding water to the pre-polymer. In any case, in an embodiment, the plurality of closed cell pores includes pores that are discrete from one another. This is in contrast to open cell pores which may be connected to one another through tunnels, such as the case for the pores in a common sponge.

Referring again to FIGS. 2C-2E, in an embodiment, mixing the pre-polymer 202 and the chain extender or cross-linker 204 with the plurality of microelements 212 further involves mixing with a second plurality of microelements 214 to form the mixture 210. Each of the second plurality of microelements 214 has a size. In one such embodiment, the heating described in association with FIG. 2E is performed at a temperature sufficiently low such that the size of each of the second plurality of microelements 214 is essentially the same before and after the heating, as is depicted in FIG. 2E. In a specific such embodiment, the heating is performed at a temperature of approximately 100 degrees Celsius or less, and the second plurality of microelements 214 has an expansion threshold of greater than approximately 130 degrees Celsius. In one other embodiment, the second plurality of microelements 214 has an expansion threshold greater than an expansion threshold of the plurality of microelements 212. In one specific such embodiment, the expansion threshold of the second plurality of microelements 214 is greater than approximately 120 degrees Celsius, and the expansion threshold of the plurality of microelements 212 is less than approximately 110 degrees Celsius. As such, in an embodiment, during the heating, the microelements 212 expand during to heating to provide expanded microelements 218, while the microelements 214 essentially remain unchanged.

In an embodiment, each of the second plurality of microelements 214 is composed of pre-expanded and gas-filled EXPANCEL™ distributed throughout (e.g., as an additional component in) the polishing pad. That is, any significant expansion that could occur for the microelements 214 is carried our prior to their inclusion in a polishing pad formation, e.g., before being included in mixture 210. In a specific embodiment, the pre-expanded EXPANCEL™ is filled with pentane. In an embodiment, the microelements 214 provide a plurality of closed cell pores (shown again as 214 with little to no change during the molding process) has a diameter approximately in the range of 10-100 microns. In an embodiment, the resulting plurality of closed cell pores includes pores that are discrete from one another. This is in contrast to open cell pores which may be connected to one another through tunnels, such as the case for the pores in a common sponge.

As described above, increasing porosity by adding more porogen than for a typical pad formulation can increase the viscosity of the formulation to levels unmanageable for a casting or molding process. The case can be particularly difficult for the inclusion of pre-expanded porogens or porogens that retain essentially the same volume throughout the molding or casting process. On the other hand, if all final closed cell pores are generated from unexpanded porogens, the viscosity of the formulation may be too low for manageability in casting or molding. In order to address such situations, in accordance with an embodiment of the present invention, conceptually, a mixture of the pre-polymer 202, the chain extender or cross-linker 204, and the second plurality of microelements 214 has a viscosity. Meanwhile, the mixture of the pre-polymer 202, the chain extender or cross-linker 204, the plurality of microelements 212 having the initial size, and the second plurality of microelements 214 essentially has the same viscosity. That is, the inclusion of the plurality of microelements 212 having the initial (smaller) size has little to no impact on the viscosity of the mixture. In an embodiment, then, a described viscosity for optimal molding conditions may be selected based on the inclusion of the second plurality of microelements with a size that remains essentially constant throughout the molding process. In one such embodiment, then, the viscosity is a predetermined viscosity, and a relative amount of the second plurality of microelements 214 in the mixture 210 is selected based on the predetermined viscosity. And, in one embodiment, the plurality of microelements 212 has little to no effect on the viscosity of the mixture 210.

Referring again to FIG. 2E, in an embodiment, in a case where two different pluralities of microelements are included, each of the plurality of microelements 218 having the expanded final size is of approximately the same shape and size as each of the plurality of microelements 214 which do not expand through the heating process, as is depicted. It is to be understood, however, that each of the plurality of microelements 218 having the expanded final size need not have the same shape and/or size as each of the plurality of microelements 214. In an embodiment, as described in greater detail below in association with FIGS. 6A-6C, the resulting molded polishing body of pad 222 includes, as closed cell pores, the plurality of expanded microelements 218 having a first diameter mode with a first peak of size distribution. Also included, also as closed cell pores, is the second plurality of microelements 214 having a second diameter mode with a second, different, peak of size distribution. In one such embodiment, the plurality of closed cell pores of microelements 218 and the second plurality of closed cell pores of microelements 214 provides a total pore volume in the thermoset polyurethane material approximately in the range of 55-80% of the total volume of the thermoset polyurethane material of low density polishing pad 222.

Referring again to FIGS. 2D-2G in an embodiment, heating the mixture 210 to provide the molded polishing body 222 involves forming the polishing body 222 having a density of less than 0.5 g/cc. In one such embodiment, however, the mixture 210 has a density of greater than 0.5 g/cc prior to the heating. In an embodiment, the pre-polymer 202 is an isocyanate and the chain extender or cross-linker 204 is an aromatic diamine compound, and the polishing pad 222 is composed of a thermoset polyurethane material 220. In one such embodiment, forming mixture 210 further involves adding an opacifying filler to the pre-polymer 202 and the chain extender or cross-linker 204 to ultimately provide an opaque molded polishing body 222. In a specific such embodiment, the opacifying filler is a material such as, but not limited to, boron nitride, cerium fluoride, graphite, graphite fluoride, molybdenum sulfide, niobium sulfide, talc, tantalum sulfide, tungsten disulfide, or Teflon. In an embodiment, as mentioned briefly above, the mixture 210 is only partially cured in the mold 200 and, in one embodiment, is further cured in an oven subsequent to removal from the formation mold 220.

In an embodiment, the polishing pad precursor mixture 210 is used to ultimately form a molded homogeneous polishing body 222 composed of a thermoset, closed cell polyurethane material. In one such embodiment, the polishing pad precursor mixture 210 is used to ultimately form a hard pad and only a single type of curative 204 is used. In another embodiment, the polishing pad precursor mixture 210 is used to ultimately form a soft pad and a combination of a primary and a secondary curative (together providing 210) is used. For example, in a specific embodiment, the pre-polymer 202 includes a polyurethane precursor, the primary curative includes an aromatic diamine compound, and the secondary curative includes an ether linkage. In a particular embodiment, the polyurethane precursor is an isocyanate, the primary curative is an aromatic diamine, and the secondary curative is a curative such as, but not limited to, polytetramethylene glycol, amino-functionalized glycol, or amino-functionalized polyoxypropylene. In an embodiment, a pre-polymer 202, a primary curative, and a secondary curative (together 204) have an approximate molar ratio of 106 parts pre-polymer, 85 parts primary curative, and 15 parts secondary curative, i.e., to provide a stoichiometry of approximately 1:0.96 pre-polymer:curative. It is to be understood that variations of the ratio may be used to provide polishing pads with varying hardness values, or based on the specific nature of the pre-polymer and the first and second curatives.

Referring again to FIG. 2G, as described above, in an embodiment, heating in the formation mold 200 involves forming a groove pattern in the polishing surface 224 of the molded polishing body 222. The groove pattern as shown includes radial grooves and concentric circular circumferential grooves. It is to be understood that radial grooves or circumferential grooves may be omitted. Furthermore, the concentric circumferential grooves may instead be polygons, such as nested triangles, squares, pentagons, hexagons, etc. Alternatively, the polishing surface may instead be based on protrusions instead of grooves. Furthermore, a low density polishing pad may be fabricated without grooves in the polishing surface. In one such example, a non-patterned lid of a molding apparatus is used instead of a patterned lid. Or, alternatively, the use of a lid during molding may be omitted. In the case of the use of a lid during molding, the mixture 210 may be heated under a pressure approximately in the range of 2-12 pounds per square inch.

In an aspect, a low density pad may be fabricated having closed cell pores. For example, in an embodiment, a polishing pad includes a polishing body having a density of less than 0.6 and composed of a thermoset polyurethane material. A plurality of closed cell pores is dispersed in the thermoset polyurethane material. In a particular embodiment, the density is less than 0.5 g/cc. In an embodiment, the plurality of closed cell pores provides a total pore volume in the thermoset polyurethane material approximately in the range of 55-80% of the total volume of the thermoset polyurethane material. In an embodiment, each of the plurality of closed cell pores is essentially spherical. In an embodiment, the polishing body further includes a first, grooved surface; and a second, flat, surface opposite the first surface, as described in association with FIG. 2G. In an embodiment, the polishing body is a homogeneous polishing body, as is described in greater detail below.

In one exemplary embodiment, each of the plurality of closed cell pores includes a physical shell composed of a material different from the thermoset polyurethane material. In such a case, the closed cell pores may be fabricated by including a porogen in a mixture that is molded for ultimate pad fabrication, as described above.

In another exemplary embodiment, each of the plurality of closed cell pores includes a physical shell composed of a material different from the thermoset polyurethane material. The physical shells of a first portion of the plurality of closed cell pores are composed of a material different than the physical shells of a second portion of the plurality of closed cell pores. In such a case, the closed cell pores may be fabricated by including two types of porogens (e.g., expanded and unexpanded) in a mixture that is molded for ultimate pad fabrication, as described above.

In another exemplary embodiment, each of only a portion of the plurality of closed cell pores includes a physical shell composed of a material different from the thermoset polyurethane material. In such a case, the closed cell pores may be fabricated by including both porogens and gas bubbles or liquid drops in a mixture that is molded for ultimate pad fabrication, as described above.

In another exemplary embodiment, each of the plurality of closed cell pores does not include a physical shell of a material different from the thermoset polyurethane material. In such a case, the closed cell pores may be fabricated by including gas bubbles or liquid drops, or both, in a mixture that is molded for ultimate pad fabrication, as described above.

Figure 3:
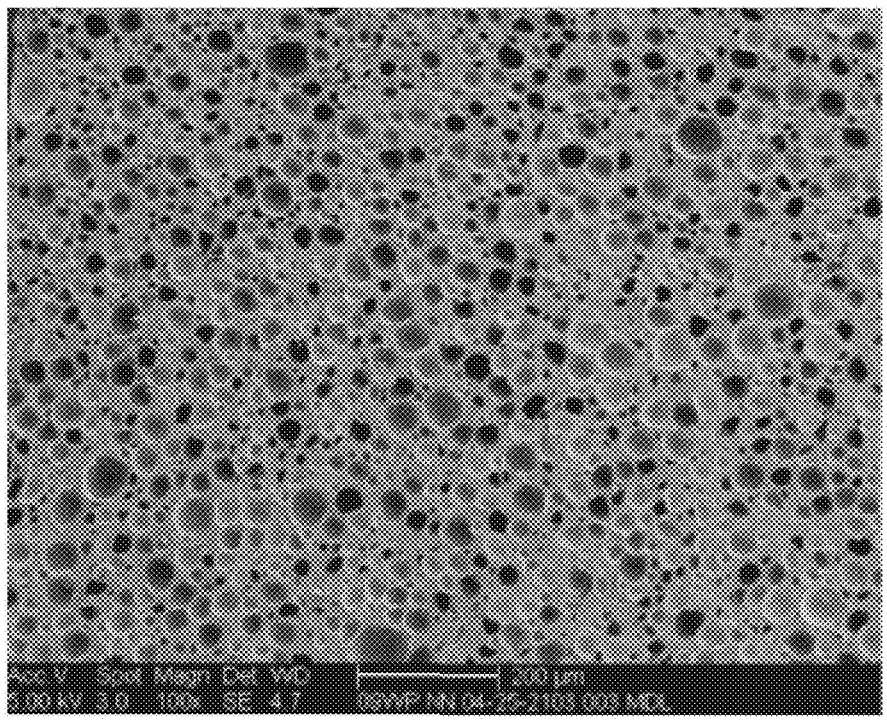
FIG. 3 illustrates cross-sectional views at 100× and 300× magnification of a low density polishing pad including closed cell pores which are all based on a porogen filler, in accordance with an embodiment of the present invention.
Figure 3:
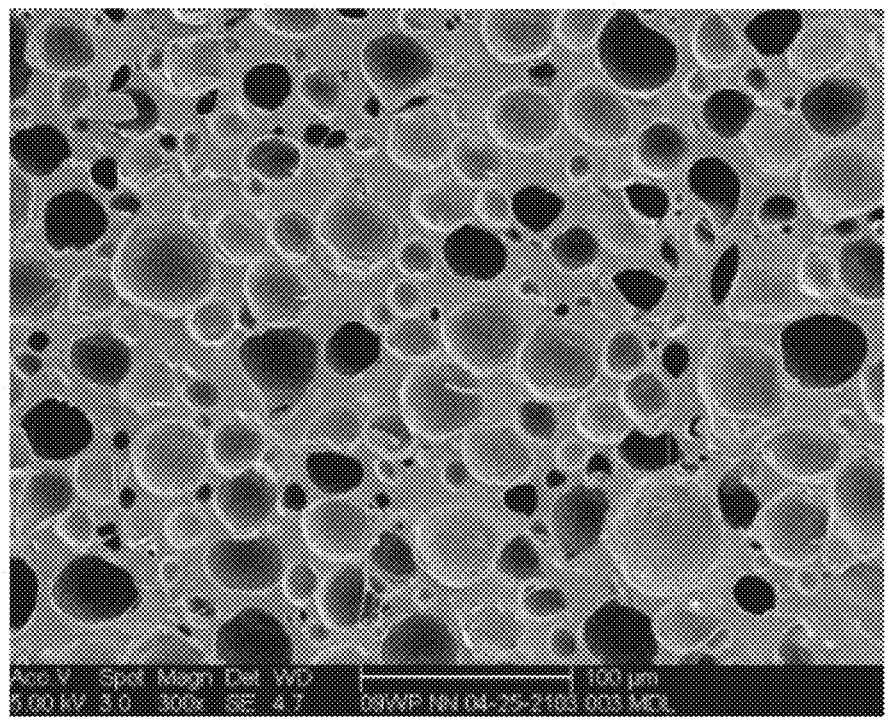

FIG. 3 illustrates cross-sectional views at 100× and 300× magnification of a low density polishing pad 300 including closed cell pores which are all based on a porogen filler, in accordance with an embodiment of the present invention. Referring to FIG. 3, all pores shown are formed from a porogen and, as such, all include a physical shell. A portion of the pores is formed from a pre-expanded Expancel porogen. Another portion is formed from an unexpanded Expancel porogen which expanded during a molding process used to fabricate polishing pad 300. In one such embodiment, the un-expanded Expancel expands at low temperature by design. The molding or casting process temperature is above the expansion temperature and the Expancel rapidly expands during the molding or casting. The density of pad 300 is approximately 0.45 and all pores in the pad are closed cell pores.

Figure 4:
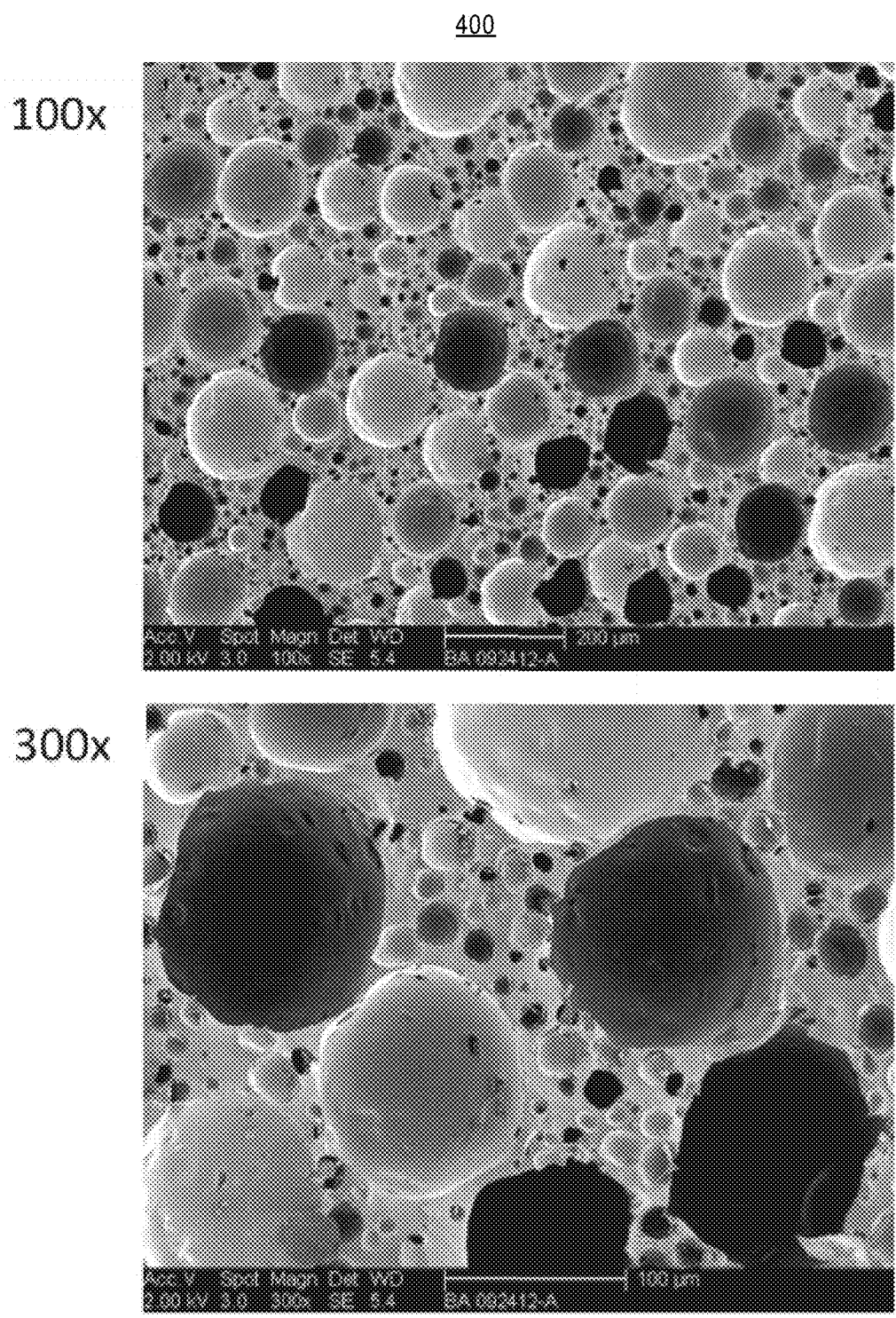
FIG. 4 illustrates cross-sectional views at 100× and 300× magnification of a low density polishing pad including closed cell pores, a portion of which based on a porogen filler and a portion of which is based on gas bubbles, in accordance with an embodiment of the present invention.

FIG. 4 illustrates cross-sectional views at 100× and 300× magnification of a low density polishing pad 400 including closed cell pores, a portion of which based on a porogen filler and a portion of which is based on gas bubbles, in accordance with an embodiment of the present invention. Referring to FIG. 4, the small pores shown are formed from a porogen and, as such, include a physical shell. More specifically, the small pores are formed from a pre-expanded Expancel porogen. The large pores are formed using a gas. More specifically, the large pores are formed using a small quantity of water and surfactant injected into a pad formulation mixture just prior to molding or casting. During the chemical reaction for chain extension, there is a competing chemical reaction of the water with NCO to form $CO_2$ and create pores. It is to be understood that the surfactant type and concentration, as well as catalyst type and level, controls pore size and the closes/open cell pore ratio. The density of pad 400 is approximately 0.37 and a significant majority of the pores in the pad are closed cell pores.

Figure 5A:
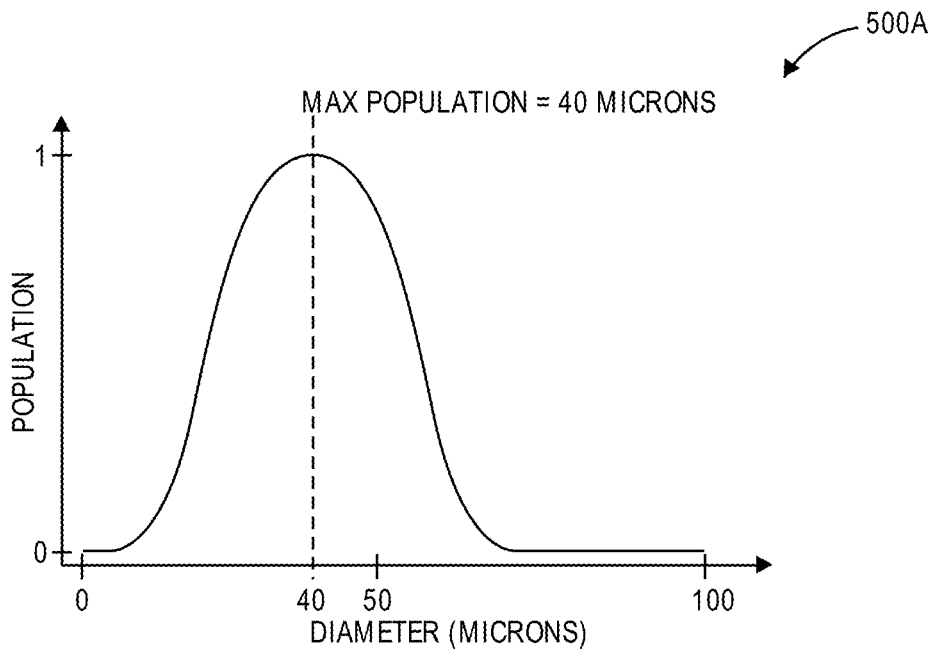
FIG. 5A illustrates a plot of population as a function of pore diameter for a broad mono-modal distribution of pore diameters in a low density polishing pad, in accordance with an embodiment of the present invention.
Figure 5B:
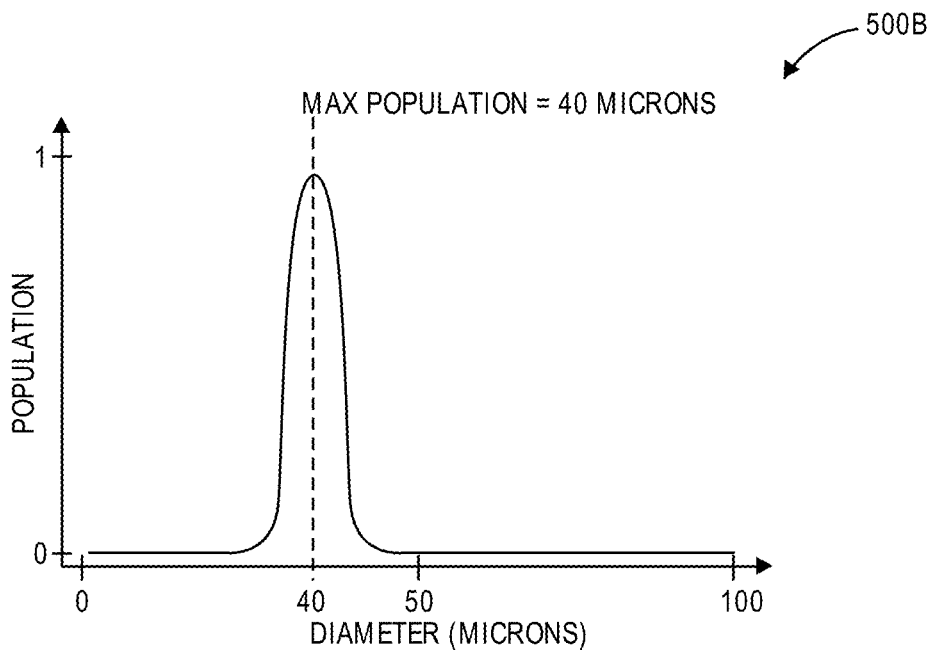
FIG. 5B illustrates a plot of population as a function of pore diameter for a narrow mono-modal distribution of pore diameters in a low density polishing pad, in accordance with an embodiment of the present invention.

In an aspect, a distribution of pore diameters in a polishing pad can have a bell curve or mono-modal distribution. For example, FIG. 5A illustrates a plot of population as a function of pore diameter for a broad mono-modal distribution of pore diameters in a low density polishing pad, in accordance with an embodiment of the present invention. Referring to plot 500A of FIG. 5A, the mono-modal distribution may be relatively broad. As another example, FIG. 5B illustrates a plot of population as a function of pore diameter for a narrow mono-modal distribution of pore diameters in a low density polishing pad, in accordance with an embodiment of the present invention. Referring to plot 500B of FIG. 5B, the mono-modal distribution may be relatively narrow. In either the narrow distribution or the broad distribution, only one maximum diameter population, such as a maximum population at 40 microns (as shown as an example), is provided in the polishing pad.

In another aspect, a low density polishing pad may instead be fabricated with a bimodal distribution of pore diameters. As an example, FIG. 6A illustrates a cross-sectional view of a low density polishing pad having an approximately 1:1 bimodal distribution of closed-cell pores, in accordance with an embodiment of the present invention.

Figure 6A:
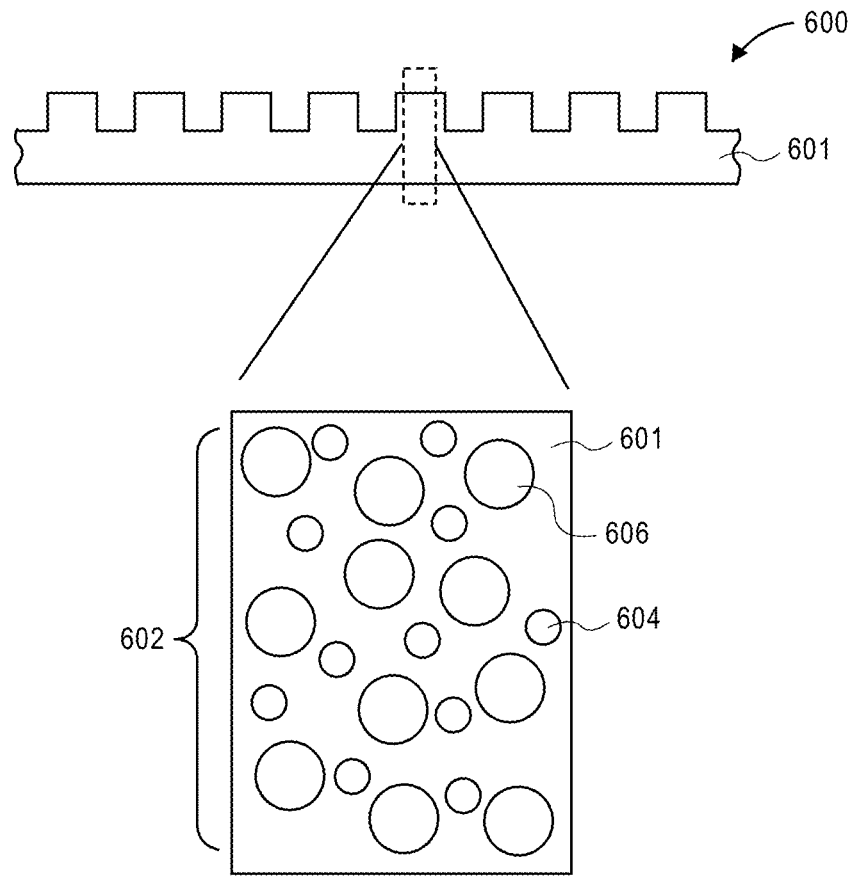
FIG. 6A illustrates a cross-sectional view of a low density polishing pad having an approximately 1:1 bimodal distribution of closed-cell pores, in accordance with an embodiment of the present invention.

Referring to FIG. 6A, a polishing pad 600 includes a homogeneous polishing body 601. The homogeneous polishing body 601 is composed of a thermoset polyurethane material with a plurality of closed cell pores 602 disposed in the homogeneous polishing body 601. The plurality of closed cell pores 602 has a multi-modal distribution of diameters. In an embodiment, the multi-modal distribution of diameters is a bimodal distribution of diameters including a small diameter mode 604 and a large diameter mode 606, as depicted in FIG. 6A.

In an embodiment, the plurality of closed cell pores 602 includes pores that are discrete from one another, as depicted in FIG. 6A. This is in contrast to open cell pores which may be connected to one another through tunnels, such as the case for the pores in a common sponge. In one embodiment, each of the closed cell pores includes a physical shell, such as a shell of a porogen. In another embodiment, however, some or all of the closed cell pores does not include a physical shell. In an embodiment, the plurality of closed cell pores 602, and hence the multi-modal distribution of diameters, is distributed essentially evenly and uniformly throughout the thermoset polyurethane material of homogeneous polishing body 601, as depicted in FIG. 6A.

Figure 6B:
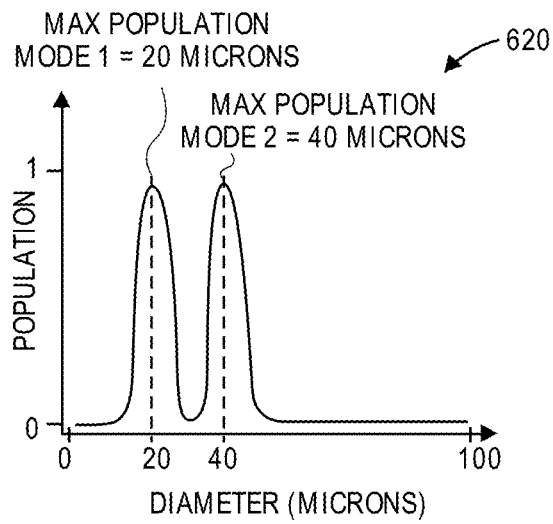
FIG. 6B illustrates a plot of population as a function of pore diameter for a narrow distribution of pore diameters in the polishing pad of FIG. 6A, in accordance with an embodiment of the present invention.
Figure 6C:
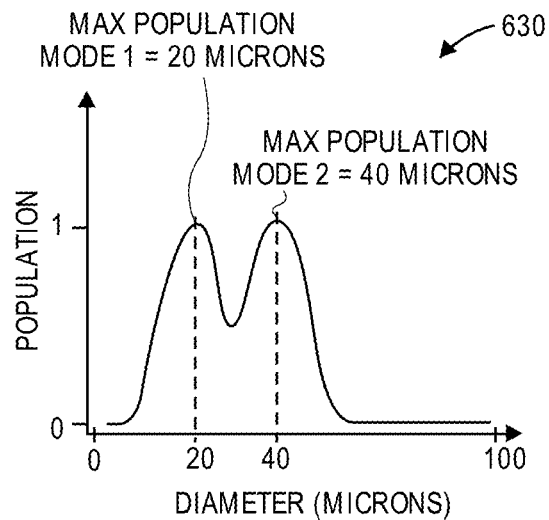
FIG. 6C illustrates a plot of population as a function of pore diameter for a broad distribution of pore diameters in the polishing pad of FIG. 6A, in accordance with an embodiment of the present invention.

In an embodiment, the bimodal distribution of pore diameters of the plurality of closed cell pores 602 may be approximately 1:1, as depicted in FIG. 6A. To better illustrate the concept, FIG. 6B illustrates a plot 620 of population as a function of pore diameter for a narrow distribution of pore diameters in the polishing pad of FIG. 6A, in accordance with an embodiment of the present invention. FIG. 6C illustrates a plot 630 of population as a function of pore diameter for a broad distribution of pore diameters in the polishing pad of FIG. 6A, in accordance with an embodiment of the present invention.

Referring to FIGS. 6A-6C, the diameter value for the maximum population of the large diameter mode 606 is approximately twice the diameter value of the maximum population of the small diameter mode 604. For example, in one embodiment, the diameter value for the maximum population of the large diameter mode 606 is approximately 40 microns and the diameter value of the maximum population of the small diameter mode 604 is approximately 20 microns, as depicted in FIGS. 6B and 6C. As another example, the diameter value for the maximum population of the large diameter mode 606 is approximately 80 microns and the diameter value of the maximum population of the small diameter mode 604 is approximately 40 microns.

Referring to plot 620 of FIG. 6B, in one embodiment, the distributions of pore diameters are narrow. In a specific embodiment, the population of the large diameter mode 606 has essentially no overlap with the population of the small diameter mode 604. However, referring to plot 630 of FIG. 6C, in another embodiment, the distributions of pore diameters are broad. In a specific embodiment, the population of the large diameter mode 606 overlaps with the population of the small diameter mode 604. It is to be understood that, a bimodal distribution of pore diameters need not be 1:1, as is described above in association with FIGS. 6A-6C. Also, a bimodal distribution of pore diameters need not be uniform. In another embodiment, the multi-modal distribution of diameters of closed cell pores is graded throughout the thermoset polyurethane material with a gradient from the first, grooved surface to the second, flat surface. In one such embodiment, the graded multi-modal distribution of diameters is a bimodal distribution of diameters including a small diameter mode proximate to the first, grooved surface, and a large diameter mode proximate to the second, flat surface.

In an embodiment, then, low density polishing pad has a plurality of closed cell pores with a bi-modal distribution of diameters having a first diameter mode with a first peak of size distribution and a second diameter mode with a second, different, peak of size distribution. In one such embodiment, the closed cell pores of the first diameter mode each include a physical shell composed of a material different from the thermoset polyurethane material. In a specific such embodiment, the closed cell pores of the second diameter mode each include a physical shell composed a material different from the thermoset polyurethane material. In a particular such embodiment, the physical shell of each of the closed cell pores of the second diameter mode is composed of a material different from the material of the physical shells of the closed cell pores of the first diameter mode.

In an embodiment, the first peak of size distribution of the first diameter mode has a diameter approximately in the range of 10-50 microns, and the second peak of size distribution of the second diameter mode has a diameter approximately in the range of 10-150 microns. In an embodiment, the first diameter mode overlaps with the second diameter mode. In another embodiment, however, the first diameter mode has essentially no overlap with the second diameter mode. In an embodiment, a total population in count number of the first diameter mode is not equal to a total population in count number of the second diameter mode. In another embodiment, however, a total population in count number of the first diameter mode is approximately equal to a total population in count number of the second diameter mode. In an embodiment, the bi-modal distribution of diameters is distributed essentially evenly throughout the thermoset polyurethane material. In another embodiment, however, the bi-modal distribution of diameters is distributed in a graded fashion throughout the thermoset polyurethane material.

In another aspect of the present invention, a low density polishing pads is fabricated in a molding process using a support layer as a manufacturing aid for the molding process. For example, FIGS. 7A-7H illustrate cross-sectional views of operations used in the fabrication of a low density polishing pad, in accordance with another embodiment of the present invention.

Figure 7A:
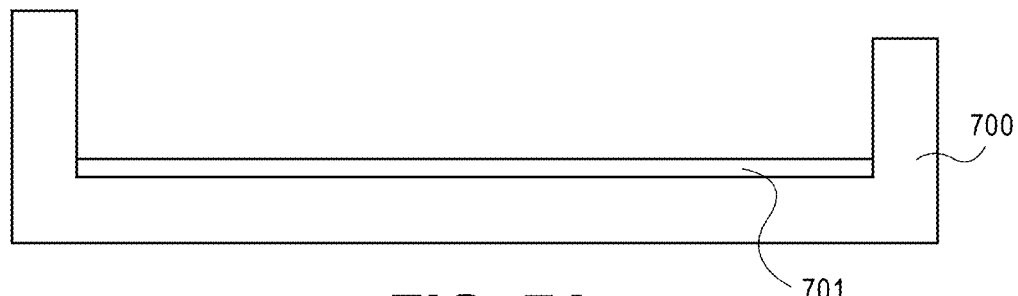
FIGS. 7A-7H illustrate cross-sectional views of operations used in the fabrication of a polishing pad, in accordance with an embodiment of the present invention.

Referring to FIG. 7A, a formation mold 700 is provided. In an embodiment, a support layer 701 is positioned at the bottom of the formation mold 700. The support layer 701 may be used as a manufacturing aid in the molding of a polishing pad and may be removed following pad manufacture or may be retained as coupled to the final pad. In an embodiment, the support layer is a polymeric support layer, such as a polycarbonate support layer. In an embodiment, the support layer 701 has a thickness less than approximately 20 mils and, in a particular embodiment, has a thickness of approximately 5 mils. In one such embodiment, the thickness is selected to provide a suitably flexible support layer 701 that aids in or enables a demolding process used in the fabrication of a low density polishing pad. In an embodiment, the support layer is a material layer such as, but not limited to, a plastic film, a woven fabric, paper, a metal foil, a mesh of metal, or a mesh of carbon fiber.

Figure 7B:
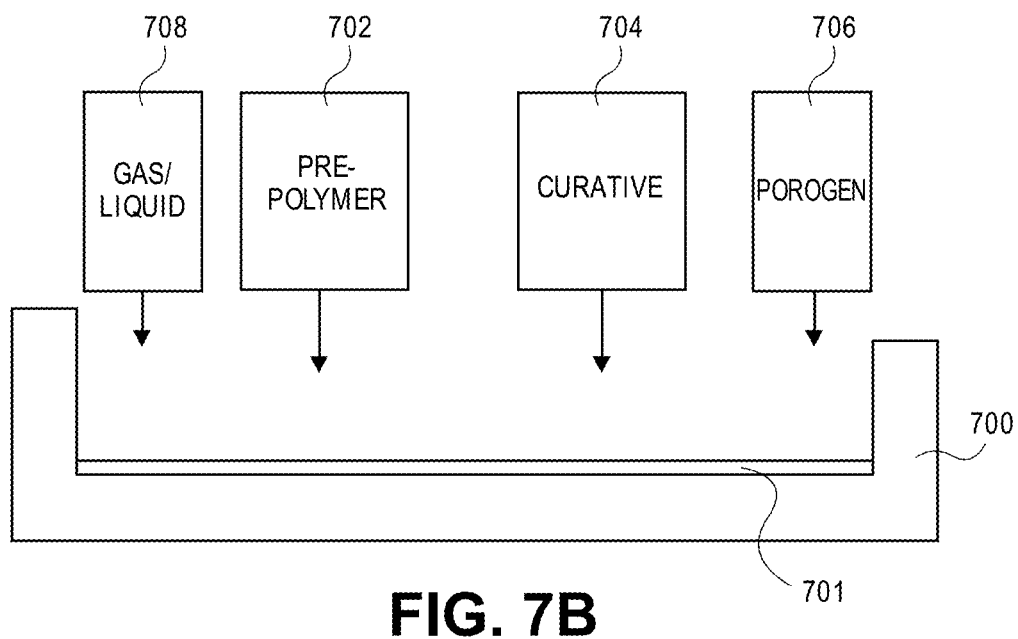

Referring to FIG. 7B, a pre-polymer 702 and a curative 704 (e.g., a chain extender or cross-linker) are mixed with porogens 706 to form a mixture. In an embodiment, the porogens 706 are microelements, such as filled or hollow polymeric microspheres, as is described in greater detail below. Optionally, the mixture 710 may be further injected with a gas or liquid 708.

Figure 7C:
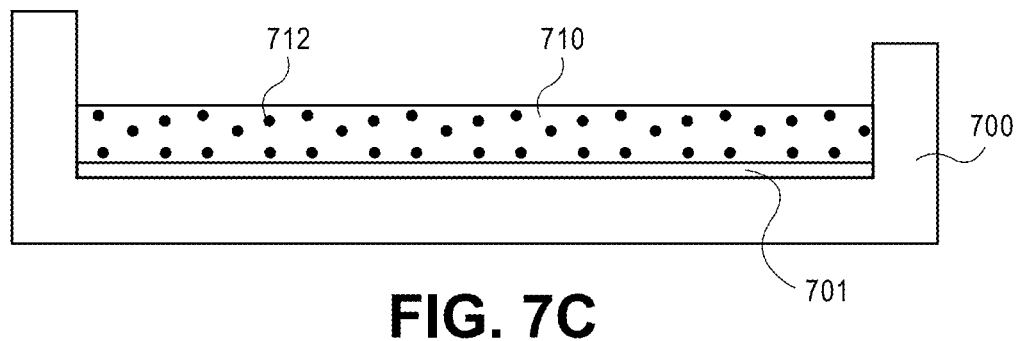

Referring to FIG. 7C, the resulting mixture 710 from FIG. 7B is shown at the base of the formation mold 700, on the support layer 701. The mixture 710 includes a plurality of polymeric microelements 712 (i.e., porogens 706), each of the plurality of microelements having an initial size. In one such embodiment, all or substantially all of the polymeric microelements 712 are unexpanded porogens that are suitable to expand in size during the pad molding process, as is described in greater detail below. In other contexts described above, if all final closed cell pores are generated from unexpanded porogens, the viscosity of the formulation may be too low for manageability in casting or molding. However, in another embodiment as presently described, inclusion of a support layer 701 at the base of the formation mold 700 enables use of a relatively less viscous mixture without some of the handling issues described above. For example, in an embodiment, since the support layer 701 occupies a portion of the volume of the formation mold, relatively less volume of mixture is required for pad fabrication. As such, the lower viscosity of the mixture due to the presence of only (or substantially only) unexpanded porogens becomes manageable since the volume of mixture is reduced. Additionally, uniform spreading of the mixture may in fact be enhanced across the support layer 701 due to the relatively lower viscosity of the mixture 710. As such, in accordance with an embodiment of the present invention, fabrication of a low density polishing pad is facilitated by using a support layer in a molding process involving use of essentially only un-expanded polymeric microelements which expand to a larger size during the molding process.

In an embodiment, an embodiment, the un-expanded polymeric microelements 712 are un-expanded gas-filled or liquid-filled EXPANCEL™ distributed throughout a mixture. Upon and/or during forming a polishing pad from the mixture, e.g., by a molding process as described below, the un-expanded gas-filled or liquid-filled EXPANCEL™ becomes expanded. In one embodiment, the un-expanded polymeric microelements 712 have an acrylic co-polymer shell and are filled with a liquid such as pentane or isobutane. Thus, in an embodiment, each of the plurality of polymeric microelements 712 having the initial size includes a physical shell, and each of the plurality of microelements having the final size includes an expanded physical shell.

Figure 7D:
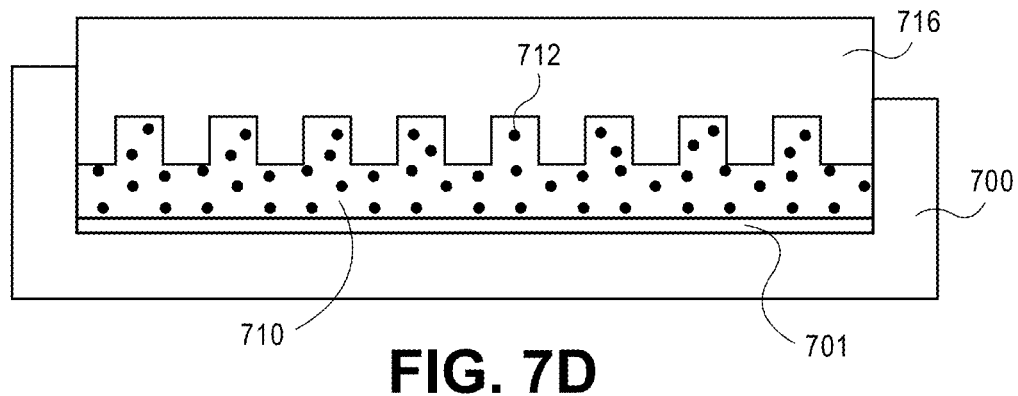

Referring to FIG. 7D, a lid 716 of the formation mold 700 is brought together with the base of the formation mold 700 and the mixture 710 takes the shape of the formation mold 700. In an embodiment, the mold 700 is degassed upon or during bringing together of the lid 716 and base of the formation mold 700 such that no cavities or voids form within the formation mold 710.

Figure 7E:
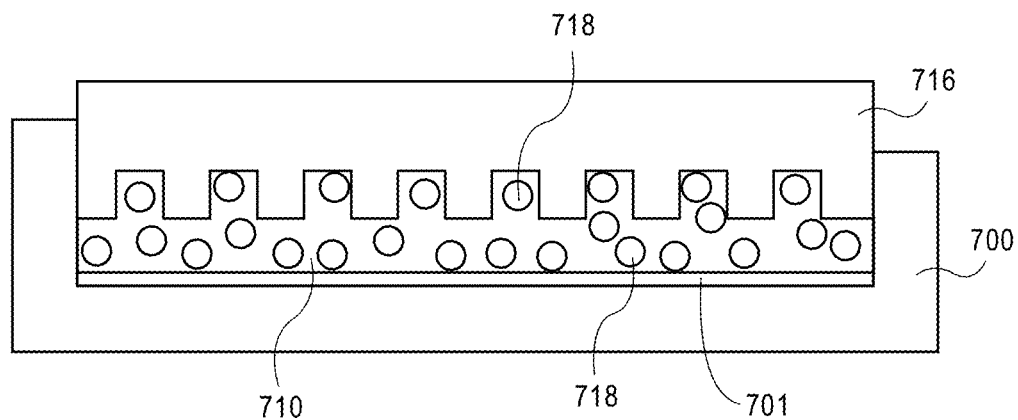

Referring to FIG. 7E, the mixture 710 is heated in the formation mold 700. Each of the plurality of polymeric microelements 712 is expanded to a larger 718 during the heating, which may be essentially the final size of the polymeric microelements. Additionally, referring to FIG. 7F, the heating is used to cure the mixture 710 to provide a partially or fully cured pad material 720 surrounding the expanded microelements 718. In one such embodiment, the curing forms a cross-linked matrix based on the materials of the pre-polymer and the curative. In an embodiment, support layer 701 provides high tensile strength and bonds well to mixture 710 cured thereon. In one such embodiment, the partially or fully cured pad material 720 is chemically/covalently or physically bonded to the support layer 701. In a specific embodiment, the mixture 710 is heated in the formation mold 700 at a temperature approximately in the range of 120-130 degrees Celsius.

Referring again to FIGS. 7D and 7E, in an embodiment, each of the plurality of microelements 712 is expanded to the larger size 718 by increasing a volume of each of the plurality of polymeric microelements by a factor approximately in the range of 3-1000. In a particular embodiment, the size is enlarged by a factor of approximately 10. In an embodiment, each of the plurality of microelements 712 is expanded to the larger (possibly final) size 718 to provide a final diameter of each of the plurality of microelements 718 approximately in the range of 10-200 microns and, in particular, in a range of approximately 20-25 microns. In an embodiment, each of the plurality of microelements 712 is expanded to the final size 718 by reducing a density of each of the plurality of microelements 712 by a factor approximately in the range of 3-1000. In a particular embodiment, the density is reduced by a factor of about 15. In an embodiment, each of the plurality of microelements 712 is expanded to the final size 718 by forming an essentially spherical shape for each of the plurality of microelements 718 of the final size. In an embodiment, the expanded polymeric microelements 718 account for approximately 50-60% of the pad material by volume. In one embodiment, upon expanding of the plurality of microelements 718, the density of the mixture 710 is reduced by a factor approximately in the range of 40-60%. In a specific embodiment, the density of the mixture 710 is reduced by a factor of approximately 50%. In a particular embodiment, the density of the mixture 710 is reduced from approximately 1.1 $g/cm^3$ to approximately 0.5 $g/cm^3$.

Figure 7F:
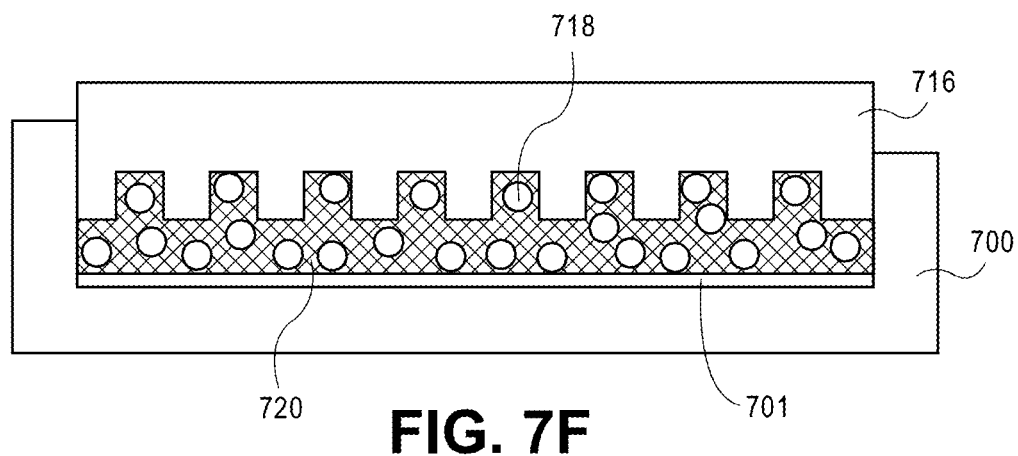

Referring collectively to FIGS. 7E and 7F, it is to be understood that the ordering of expanding the polymeric microelements 712 to the final, larger, size 718 and the curing the mixture 710 need not necessarily occur in the order illustrated. In another embodiment, during the heating, the curing of the mixture 710 occurs at the same time as expanding the microelements 712 to the final, larger size 718. In yet another embodiment, two separate heating operations are performed to cure the mixture 710 and to expand the microelements 712 to the final, larger, size 718, respectively. In an embodiment, the curing of the mixture 710 is not performed to completion in the mold 700. The curing may be completed upon removal of a partially cured pad material from the mold 700, as is described in greater detail below. Furthermore, removal of an incompletely cured pad (e.g., approximately 90-95% cured) may be facilitated by the support layer 701, as is also described in greater detail below.

In accordance with an embodiment of the present invention, by including the support layer 701 in the molding process, efficiency may be built into the molding process with respect to timing of demolding a fabricated pad from the formation mold 700. For example, in an embodiment, removal of the coupled the support layer 701 and molded polishing surface layer 720 from the formation mold 700 is performed when the extent of curing is sufficient to maintain geometry of the polishing layer 720 and to withstand stress of demolding. That is, in one embodiment, the removal is performed prior to removal of a solo molded homogeneous polishing surface layer could otherwise be performed in the absence of the support layer 701. In an embodiment, a partially cured molded polishing body is finally or completely cured outside of the formation mold 710 in an oven. In one such embodiment, the partially cured molded polishing body is finally or completely cured at a temperature less than approximately 100 degrees Celsius.

Figure 7G:
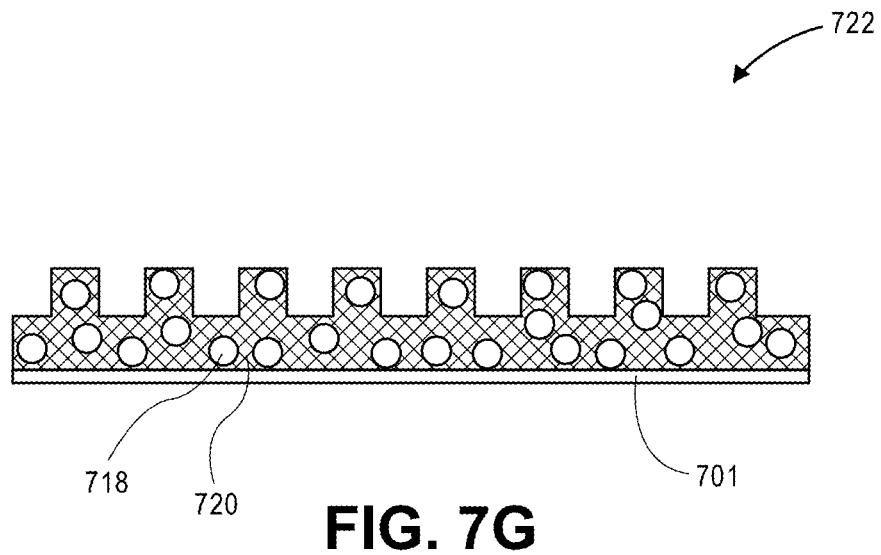

Referring to FIG. 7G, in an embodiment, the above described process is used to provide a low density polishing pad 722. The low density polishing pad 722 is composed of the cured material 720 and includes the expanded polymeric microelements 718. In an embodiment, the low density polishing pad 722 is composed of a thermoset polyurethane material and the expanded microelements 718 provide a plurality of closed cell pores dispersed in the thermoset polyurethane material. Referring again to FIG. 7G, the low density polishing pad 722 has a polishing surface having a groove pattern therein. Referring again to FIG. 7G, the final pad material remains bonded to the support layer 701. The pairing may be used as a polishing pad as is. In one exemplary embodiment, the final pad thickness is approximately in the range of 130-180 mils, approximately 5 mils of which is attributable to the thickness of the support layer 701.

Figure 7H:
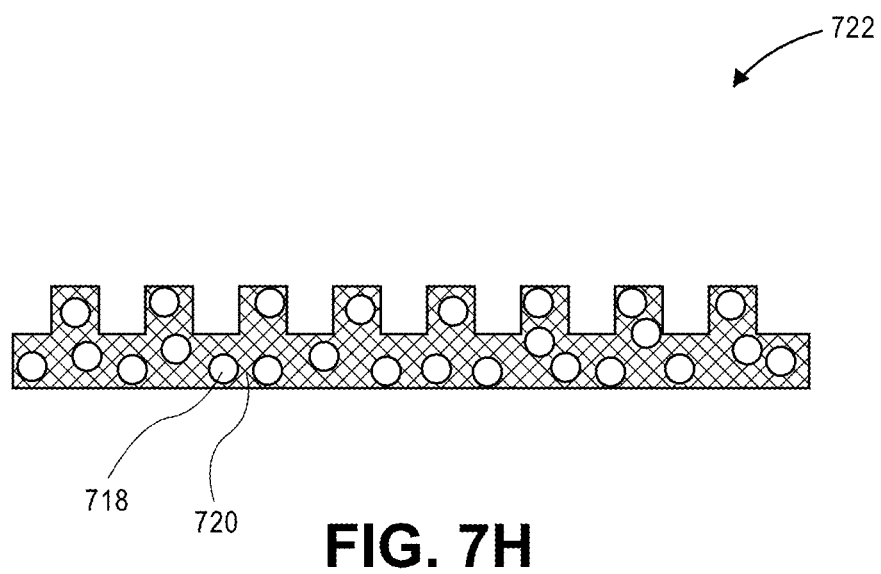

Referring to FIG. 7H, in an embodiment, the support layer 701 is a manufacturing aid that is not retained in the final polishing pad. That is, support layer 701 may be removed from the polishing pad 722. In an embodiment, removing the support layer 701 involves milling the support layer 701 off of the molded polishing body 722. In another embodiment, removing the support layer 701 involves using a technique such as, but not limited to, cutting the support layer 701 away from the molded polishing body 722, skiving the support layer 701 from the molded polishing body 722, dissolving the support layer 701, etching the support layer 701, or abrading the support layer 701.

In an embodiment, the support layer 701 is removed prior to further curing the partially cured molded polishing body outside of the formation mold 710. In another embodiment, the support layer 701 is removed during the further curing the partially cured molded polishing body outside of the formation mold 710. In yet another embodiment, the support layer 701 is removed subsequent to further curing the partially cured molded polishing body outside of the formation mold 710. In one such embodiment, the support layer 701 is retained during the final curing to aid in maintaining integrity of the partially cured molded polishing body during the final curing. The support layer 701 is then removed upon completion of the final curing.

Referring again to FIG. 7H, in an embodiment, the final polishing pad 722 is a polishing pad for polishing a substrate. In one such embodiment, the polishing pad 722 includes a polishing body having a density approximately in the range of 0.4-0.55 g/cc. The polishing body includes a thermoset polyurethane material and a plurality of closed cell pores dispersed in the thermoset polyurethane material.

In a particular embodiment, each of the plurality of closed cell pores has a shell composed of an acrylic co-polymer. In a particular embodiment, the polishing body has a density approximately in the range of 0.44-0.52 g/cc. In an embodiment, low density polishing pads described herein, such as polishing pad 222, 300, 400 or 722, or the above described variations thereof, are suitable for polishing substrates. In one such embodiment, the polishing pad is used as a buff pad. The substrate may be one used in the semiconductor manufacturing industry, such as a silicon substrate having device or other layers disposed thereon. However, the substrate may be one such as, but not limited to, a substrates for MEMS devices, reticles, or solar modules. Thus, reference to "a polishing pad for polishing a substrate," as used herein, is intended to encompass these and related possibilities.

Low density polishing pads described herein, such as polishing pad 222, 300, 400 or 722, or the above described variations thereof, may be composed of a homogeneous polishing body of a thermoset polyurethane material. In an embodiment, the homogeneous polishing body is composed of a thermoset, closed cell polyurethane material. In an embodiment, the term "homogeneous" is used to indicate that the composition of a thermoset, closed cell polyurethane material is consistent throughout the entire composition of the polishing body. For example, in an embodiment, the term "homogeneous" excludes polishing pads composed of, e.g., impregnated felt or a composition (composite) of multiple layers of differing material. In an embodiment, the term "thermoset" is used to indicate a polymer material that irreversibly cures, e.g., the precursor to the material changes irreversibly into an infusible, insoluble polymer network by curing. For example, in an embodiment, the term "thermoset" excludes polishing pads composed of, e.g., "thermoplast" materials or "thermoplastics"—those materials composed of a polymer that turns to a liquid when heated and returns to a very glassy state when cooled sufficiently. It is noted that polishing pads made from thermoset materials are typically fabricated from lower molecular weight precursors reacting to form a polymer in a chemical reaction, while pads made from thermoplastic materials are typically fabricated by heating a pre-existing polymer to cause a phase change so that a polishing pad is formed in a physical process. Polyurethane thermoset polymers may be selected for fabricating polishing pads described herein based on their stable thermal and mechanical properties, resistance to the chemical environment, and tendency for wear resistance.

In an embodiment, the homogeneous polishing body, upon conditioning and/or polishing, has a polishing surface roughness approximately in the range of 1-5 microns root mean square. In one embodiment, the homogeneous polishing body, upon conditioning and/or polishing, has a polishing surface roughness of approximately 2.35 microns root mean square. In an embodiment, the homogeneous polishing body has a storage modulus at 25 degrees Celsius approximately in the range of 30-120 megaPascals (MPa). In another embodiment, the homogeneous polishing body has a storage modulus at 25 degrees Celsius approximately less than 30 megaPascals (MPa). In one embodiment, the homogeneous polishing body has a compressibility of approximately 2.5%.

In an embodiment, low density polishing pads described herein, such as polishing pad 222, 300, 400 or 722, or the above described variations thereof, include a molded homogeneous polishing body. The term "molded" is used to indicate that a homogeneous polishing body is formed in a formation mold, as described in more detail above in association with FIGS. 2A-2G or FIGS. 7A-7H. It is to be understood that, in other embodiments, a casting process may be used instead to fabricate low density polishing pads such as those described above.

In an embodiment, the homogeneous polishing body is opaque. In one embodiment, the term "opaque" is used to indicate a material that allows approximately 10% or less visible light to pass. In one embodiment, the homogeneous polishing body is opaque in most part, or due entirely to, the inclusion of an opacifying filler throughout (e.g., as an additional component in) the homogeneous thermoset, closed cell polyurethane material of the homogeneous polishing body. In a specific embodiment, the opacifying filler is a material such as, but not limited to, boron nitride, cerium fluoride, graphite, graphite fluoride, molybdenum sulfide, niobium sulfide, talc, tantalum sulfide, tungsten disulfide, or Teflon.

The sizing of the low density polishing pads, such as pads 222, 300, 400 or 722, may be varied according to application. Nonetheless, certain parameters may be used to fabricate polishing pads compatible with conventional processing equipment or even with conventional chemical mechanical processing operations. For example, in accordance with an embodiment of the present invention, a low density polishing pad has a thickness approximately in the range of 0.075 inches to 0.130 inches, e.g., approximately in the range of 1.9-3.3 millimeters. In one embodiment, a low density polishing pad has a diameter approximately in the range of 20 inches to 30.3 inches, e.g., approximately in the range of 50-77 centimeters, and possibly approximately in the range of 10 inches to 42 inches, e.g., approximately in the range of 25-107 centimeters.

In another embodiment of the present invention, a low density polishing pad described herein further includes a local area transparency (LAT) region disposed in the polishing pad. In an embodiment, the LAT region is disposed in, and covalently bonded with, the polishing pad. Examples of suitable LAT regions are described in U.S. patent application Ser. No. 12/657,135 filed on Jan. 13, 2010, assigned to NexPlanar Corporation, and U.S. patent application Ser. No. 12/895,465 filed on Sep. 30, 2010, assigned to NexPlanar Corporation. In an alternative or additional embodiment, a low density polishing pad further includes an aperture disposed in the polishing surface and polishing body. The aperture can accommodate, e.g., a detection device included in a platen of a polishing tool. An adhesive sheet is disposed on the back surface of the polishing body. The adhesive sheet provides an impermeable seal for the aperture at the back surface of the polishing body. Examples of suitable apertures are described in U.S. patent application Ser. No. 13/184,395 filed on Jul. 15, 2011, assigned to NexPlanar Corporation. In another embodiment, a low density polishing pad further includes a detection region for use with, e.g., an eddy current detection system. Examples of suitable eddy current detection regions are described in U.S. patent application Ser. No. 12/895,465 filed on Sep. 30, 2010, assigned to NexPlanar Corporation.

Low density polishing pads described herein, such as polishing pad 222, 300, 400 or 722, or the above described variations thereof, may further include a foundation layer disposed on the back surface of the polishing body. In one such embodiment, the result is a polishing pad with bulk or foundation material different from the material of the polishing surface. In one embodiment, a composite polishing pad includes a foundation or bulk layer fabricated from a stable, essentially non-compressible, inert material onto which a polishing surface layer is disposed. A harder foundation layer may provide support and strength for pad integrity while a softer polishing surface layer may reduce scratching, enabling decoupling of the material properties of the polishing layer and the remainder of the polishing pad. Examples of suitable foundation layers are described in U.S. patent application Ser. No. 13/306,845 filed on Nov. 29, 2011, assigned to NexPlanar Corporation.

Low density polishing pads described herein, such as polishing pad 222, 300, 400 or 722, or the above described variations thereof, may further include a sub pad disposed on the back surface of the polishing body, e.g., a conventional sub pad as known in the CMP art. In one such embodiment, the sub pad is composed of a material such as, but not limited to, foam, rubber, fiber, felt or a highly porous material.

Referring again to FIG. 2G as a foundation for description, individual grooves of a groove pattern formed in a low density polishing pad such as those described herein may be from about 4 to about 100 mils deep at any given point on each groove. In some embodiments, the grooves are about 10 to about 50 mils deep at any given point on each groove. The grooves may be of uniform depth, variable depth, or any combinations thereof. In some embodiments, the grooves are all of uniform depth. For example, the grooves of a groove pattern may all have the same depth. In some embodiments, some of the grooves of a groove pattern may have a certain uniform depth while other grooves of the same pattern may have a different uniform depth. For example, groove depth may increase with increasing distance from the center of the polishing pad. In some embodiments, however, groove depth decreases with increasing distance from the center of the polishing pad. In some embodiments, grooves of uniform depth alternate with grooves of variable depth.

Individual grooves of a groove pattern formed in a low density polishing pad such as those described herein may be from about 2 to about 100 mils wide at any given point on each groove. In some embodiments, the grooves are about 15 to about 50 mils wide at any given point on each groove. The grooves may be of uniform width, variable width, or any combinations thereof. In some embodiments, the grooves of are all of uniform width. In some embodiments, however, some of the grooves of a concentric have a certain uniform width, while other grooves of the same pattern have a different uniform width. In some embodiments, groove width increases with increasing distance from the center of the polishing pad. In some embodiments, groove width decreases with increasing distance from the center of the polishing pad. In some embodiments, grooves of uniform width alternate with grooves of variable width.

In accordance with the previously described depth and width dimensions, individual grooves of the groove patterns described herein, including grooves at or near a location of an aperture in a polishing pad, may be of uniform volume, variable volume, or any combinations thereof. In some embodiments, the grooves are all of uniform volume. In some embodiments, however, groove volume increases with increasing distance from the center of the polishing pad. In some other embodiments, groove volume decreases with increasing distance from the center of the polishing pad. In some embodiments, grooves of uniform volume alternate with grooves of variable volume.

Grooves of the groove patterns described herein may have a pitch from about 30 to about 1000 mils. In some embodiments, the grooves have a pitch of about 125 mils. For a circular polishing pad, groove pitch is measured along the radius of the circular polishing pad. In CMP belts, groove pitch is measured from the center of the CMP belt to an edge of the CMP belt. The grooves may be of uniform pitch, variable pitch, or in any combinations thereof. In some embodiments, the grooves are all of uniform pitch. In some embodiments, however, groove pitch increases with increasing distance from the center of the polishing pad. In some other embodiments, groove pitch decreases with increasing distance from the center of the polishing pad. In some embodiments, the pitch of the grooves in one sector varies with increasing distance from the center of the polishing pad while the pitch of the grooves in an adjacent sector remains uniform. In some embodiments, the pitch of the grooves in one sector increases with increasing distance from the center of the polishing pad while the pitch of the grooves in an adjacent sector increases at a different rate. In some embodiments, the pitch of the grooves in one sector increases with increasing distance from the center of the polishing pad while the pitch of the grooves in an adjacent sector decreases with increasing distance from the center of the polishing pad. In some embodiments, grooves of uniform pitch alternate with grooves of variable pitch. In some embodiments, sectors of grooves of uniform pitch alternate with sectors of grooves of variable pitch.

Polishing pads described herein may be suitable for use with a variety of chemical mechanical polishing apparatuses. As an example, FIG. 8 illustrates an isometric side-on view of a polishing apparatus compatible with a low density polishing pad, in accordance with an embodiment of the present invention.

Figure 8:
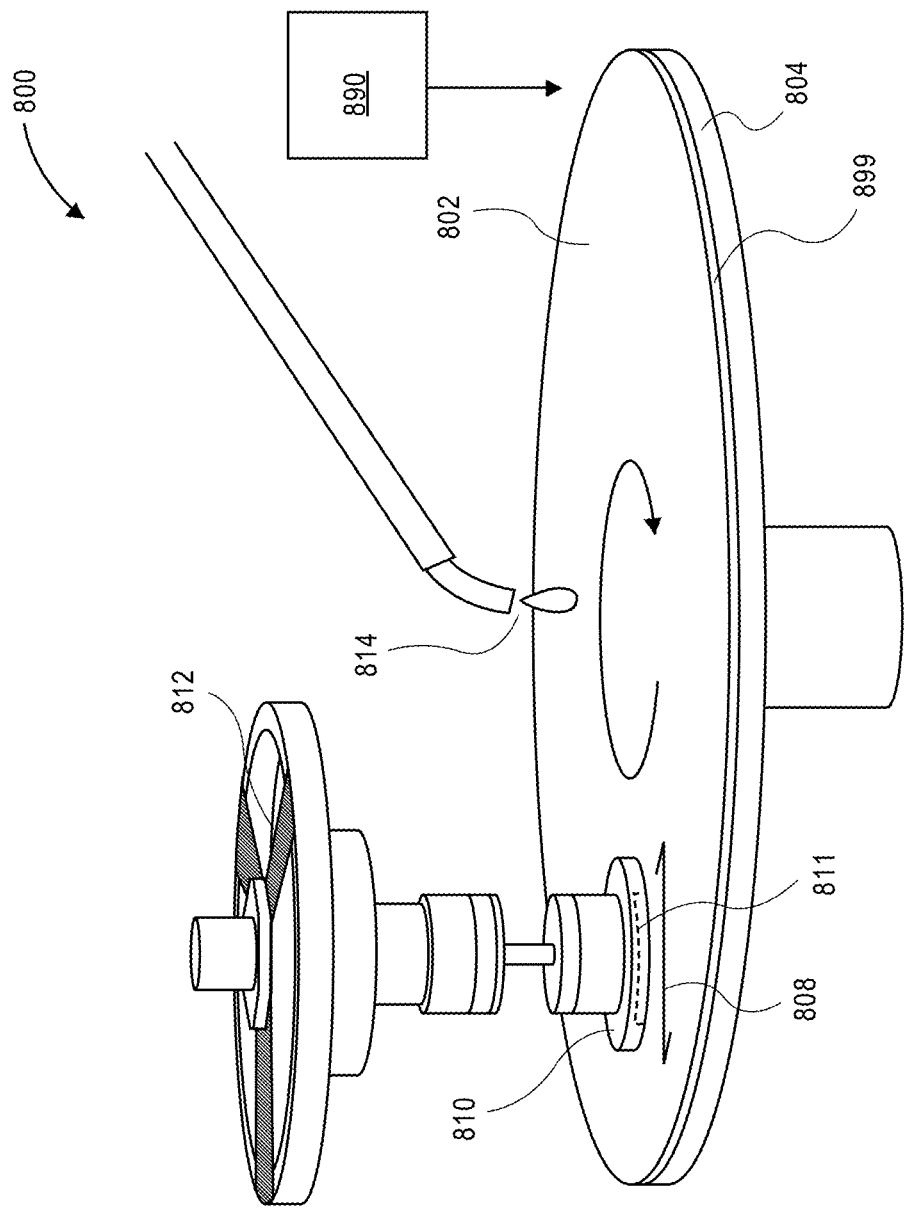
FIG. 8 illustrates an isometric side-on view of a polishing apparatus compatible with a low density polishing pad, in accordance with an embodiment of the present invention.

Referring to FIG. 8, a polishing apparatus 800 includes a platen 804. The upper surface 802 of platen 804 may be used to support a low density polishing pad 899, as is depicted in FIG. 8. Platen 804 may be configured to provide spindle rotation 806. A sample carrier 810 is used to hold a semiconductor wafer 811 in place during polishing of the semiconductor wafer with a polishing pad. Sample carrier 810 may further provide slider oscillation 708. Sample carrier 810 is further supported by a suspension mechanism 812. A slurry feed 814 is included for providing slurry to a surface of a polishing pad 899 prior to and during polishing of the semiconductor wafer. A conditioning unit 890 may also be included and, in one embodiment, includes a diamond tip for conditioning a polishing pad.

Thus, low density polishing pads and methods of fabricating low density polishing pads have been disclosed.

What is claimed is:

1. A polishing pad for polishing a substrate, the polishing pad comprising:
   a polishing body having a density approximately in the range of 0.4-0.55 g/cc and comprising:
      a thermoset polyurethane material; and
      a plurality of closed cell pores dispersed in the thermoset polyurethane material, each of the plurality of closed cell pores having a shell comprising an acrylic co-polymer, wherein the plurality of closed cell pores has a multi-modal distribution of diameters, and wherein the plurality of closed cell pores provides a total pore volume in the thermoset polyurethane material approximately in the range of 50-60% of the total volume of the thermoset polyurethane material.

2. The polishing pad of claim 1, wherein the polishing body has a density approximately in the range of 0.44-0.52 g/cc.

3. The polishing pad of claim 1, wherein the polishing body is a homogeneous polishing body.

4. The polishing pad of claim 1, wherein the polishing body further comprises:

a first, grooved surface; and a second, flat, surface opposite the first surface.

5. The polishing pad of claim 1, wherein each of the plurality of closed cell pores is essentially spherical.

6. The polishing pad of claim 1, wherein the polishing body is a molded polishing body.

7. The polishing pad of claim 1, wherein the polishing body further comprises:

an opacifying filler distributed approximately evenly throughout the polishing body.

8. The polishing pad of claim 1, further comprising:

a support layer disposed on a back surface of the polishing body.

9. The polishing pad of claim 1, further comprising:

a detection region disposed in a back surface of the polishing body.

10. The polishing pad of claim 1, further comprising:

a sub pad disposed on a back surface of the polishing body.

11. The polishing pad of claim 1, further comprising:

a local area transparency (LAT) region disposed in, and covalently bonded with, the polishing body.

* * * * *